United States Patent
Rosoff et al.

(10) Patent No.: US 11,593,172 B2
(45) Date of Patent: Feb. 28, 2023

(54) NAMESPACES AS UNITS OF MANAGEMENT IN A CLUSTERED AND VIRTUALIZED COMPUTER SYSTEM

(71) Applicant: VMware, Inc., Palo Alto, CA (US)

(72) Inventors: Jared Sean Rosoff, Palo Alto, CA (US); Mark Russell Johnson, McKinleyville, CA (US); Adrian Drzewiecki, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 316 days.

(21) Appl. No.: 16/838,613

(22) Filed: Apr. 2, 2020

(65) Prior Publication Data

US 2021/0311792 A1 Oct. 7, 2021

(51) Int. Cl.
*G06F 9/50* (2006.01)
*G06F 9/54* (2006.01)
*G06F 9/455* (2018.01)

(52) U.S. Cl.
CPC ........ *G06F 9/5027* (2013.01); *G06F 9/45558* (2013.01); *G06F 9/54* (2013.01);
(Continued)

(58) Field of Classification Search
CPC ...... G06F 9/5027; G06F 9/45558; G06F 9/54; G06F 2009/45583; G06F 2009/45591; G06F 2009/45595; G06F 2209/5011; G06F 2209/505; G06F 9/5077; G06F 2009/4557; G06F 2009/45579; G06F 2009/45587

See application file for complete search history.

(56) References Cited

U.S. PATENT DOCUMENTS 8,112,749 B2 * 2/2012 Jelinek .................... G06F 9/455
718/1
10,997,538 B1 * 5/2021 Chandrachood .......................... G06Q 10/06312

(Continued)

OTHER PUBLICATIONS

"Virtual Machine" https://en.wikipedia.org/wiki/Virtual_machine (accessible Jan. 1, 2019) (Year: 2019).*

(Continued)

*Primary Examiner* — Michael W Ayers
(74) *Attorney, Agent, or Firm* — Kim & Stewart LLP

(57) ABSTRACT

An example method of managing an application in a virtualized computing system that includes a cluster of hosts managed by a virtualization management server, the hosts including a virtualization layer executing on hardware platforms is described. The method includes: receiving a specification for a namespace at the virtualization management server, the specification defining resource constraints and authorization constraints for the namespace; preparing an environment within the virtualized computing system for the namespace in response to the specification, the environment including: a resource pool implementing at least a portion of the resource constraints as reservations and limits of resources in the virtualized computing system; and a user access policy implementing the authorization constraints within the virtualized computing system for the namespace; and managing, by the virtualization management server as a single unit, workloads of the application, the workloads deployed on the virtualization layer within the resource pool consistent with the user access policy.

20 Claims, 10 Drawing Sheets

(52) U.S. Cl.
CPC .... *G06F 9/5077* (2013.01); *G06F 2009/4557* (2013.01); *G06F 2009/45579* (2013.01); *G06F 2009/45583* (2013.01); *G06F 2009/45587* (2013.01); *G06F 2009/45591* (2013.01); *G06F 2009/45595* (2013.01); *G06F 2209/505* (2013.01); *G06F 2209/5011* (2013.01)

(56) References Cited

U.S. PATENT DOCUMENTS

| | | | | |
|---|---|---|---|---|
| 10,999,326 | B1* | 5/2021 | Pollitt | H04L 41/0806 |
| 2015/0120791 | A1* | 4/2015 | Gummaraju | G06F 9/45558 707/823 |
| 2016/0299772 | A1* | 10/2016 | Seenappa | H04L 41/0806 |
| 2017/0371693 | A1 | 12/2017 | Corrie et al. | |

OTHER PUBLICATIONS

Mohamed, Rania. "Kubernetes Cluster vs Master Node" https://www.suse.eom/c/kubernetes-cluster-vs-master-node/ (Apr. 16, 2019) (Year: 2019).*

Ernst, E. et al. "Kata Containers Architecture," GitHub, Inc., 2019, 22 pages, URL: https://github.com/kata-containers/documentation/blob/master/design/architecture.md.

Kubernetes, "Namespaces," 2019, 6 pages URL: https://v1-16.docs.kubernetes.io/docs/concepts/overview/working-with-objects/namespaces/.

VMware, Inc. "vSphere Virtual Machine Administration," Update 2, Apr. 11, 2019, pp. 1-2, 206-230 (27 pages).

VMware, Inc. "Overview of vSphere Integrated Containers," Product version: 1.5, 2019, 21 pages.

U.S. Appl. No. 16/751,529, filed Jan. 24, 2020, 48 pages.

* cited by examiner

NAMESPACES AS UNITS OF MANAGEMENT IN A CLUSTERED AND VIRTUALIZED COMPUTER SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

The result of deploying modern applications onto virtualized infrastructure is several individual VMs, storage elements, and network elements. Existing approaches to cloud and virtualization management show each of these VMs, storage elements, and network elements as individually managed objects. If an administrator wants to perform some operation on an application (e.g., backup, allocate resources, encrypt, etc.), the administrator is required to perform an operation on each of the individual objects. If the application comprises many objects, such an operation can be labor intensive and error prone. Furthermore, some operations such as performing a backup of an application, are not possible without coordinating the individual operations of each object. Accordingly, administrators desire a way to improve efficiency and mitigate errors when managing modern applications deployed onto virtualized infrastructure

SUMMARY

In an embodiment, a method of managing an application in a virtualized computing system that includes a cluster of hosts managed by a virtualization management server, the hosts including a virtualization layer executing on hardware platforms is described. The method includes: receiving a specification for a namespace at the virtualization management server, the specification defining resource constraints and authorization constraints for the namespace; preparing an environment within the virtualized computing system for the namespace in response to the specification, the environment including: a resource pool implementing at least a portion of the resource constraints as reservations and limits of resources in the virtualized computing system; and a user access policy implementing the authorization constraints within the virtualized computing system for the namespace; and managing, by the virtualization management server as a single unit, workloads of the application, the workloads deployed on the virtualization layer within the resource pool consistent with the user access policy.

Further embodiments include a non-transitory computer-readable storage medium comprising instructions that cause a computer system to carry out the above methods, as well as a computer system configured to carry out the above methods.

DETAILED DESCRIPTION

Techniques for using namespaces as units of management in a clustered and virtualized computing system are described. A virtualized computing system includes a cluster of hosts having a virtualization layer executing on host hardware platforms. The virtualization layer supports execution of virtual machines (VMs). A virtualization management server manages host clusters, the virtualization layers, and the VMs executing thereon. In embodiments, the virtualization layer of a host cluster is integrated with an orchestration control plane, such as a Kubernetes control plane. This integration provides a "supervisor cluster" that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native VMs (as opposed to pod VMs). A virtualization infrastructure administrator (VI admin) can enable a host cluster as a supervisor cluster and provide its functionality to development teams.

An application executing in the computing system can include multiple parts referred to herein as "workloads." Each workload can be implemented using one or more compute objects, such as virtual machines (VMs) and/or containers, as well as associated support objects, such as storage resources and networking resources. As noted above, managing these workloads and constituent objects individually is labor intensive and error prone. The techniques described herein simplify management of modern applications by grouping all objects of the application workloads together within a namespace for the supervisor cluster referred to as a "supervisor namespace." The supervisor namespace is a shared abstraction between application developers (e.g., users) and infrastructure managers (e.g., VI admins). A VI admin creates "supervisor namespaces" within the supervisor cluster control plane, which provide resource-constrained and authorization-constrained units of multi-tenancy. Users deploy their applications within the scope of the supervisor namespaces and subject to their constraints. In this manner, the user guarantees that all the resources they deploy as part of their application are contained within the same supervisor namespace. The VI admin sees the application and its components in the supervisor namespace as a single unit. The VI admin can perform operations at the supervisor namespace level, the results of which are applied automatically across all resources of the application. These and further advantages and aspects of the disclosed architecture are described below with respect to the drawings.

Figure 1:
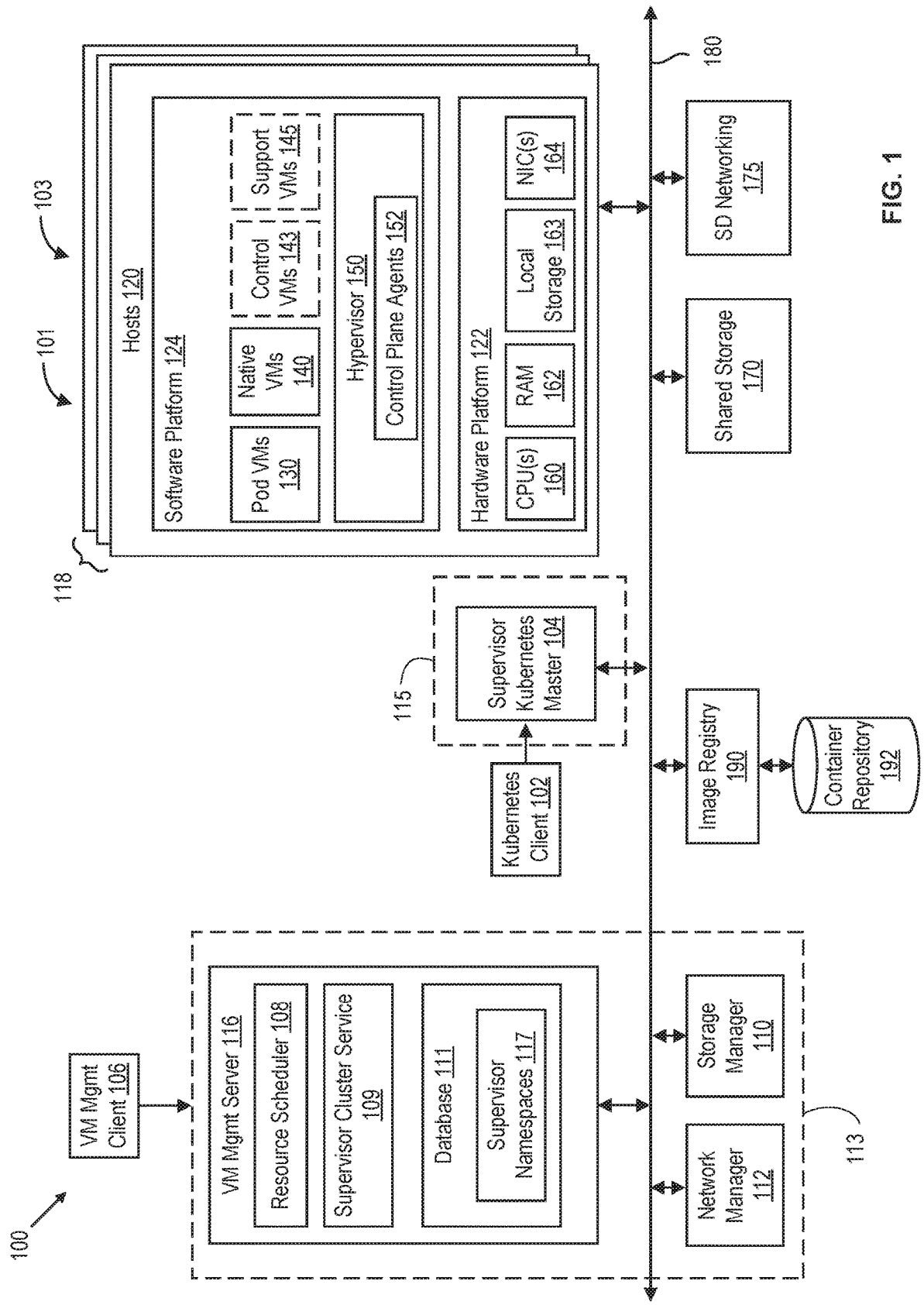
FIG. 1 is a block diagram of a virtualized computing system in which embodiments may be implemented.

FIG. 1 is a block diagram of a virtualized computing system 100 in which embodiments may be implemented. System 100 includes a cluster 118 of hosts 120 that may be constructed on server-grade hardware platforms such as an x86 architecture platforms (also referred to as "host cluster 118"). As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host OS, between hypervisor 150 and hardware platform 122. Thus, hypervisor 150 is a Type-1 hypervisor (also known as a "bare-metal" hypervisor). Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. As shown in FIG. 1, VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of orchestration control plane 115 executing in hypervisor 150 (referred to as a pod VM controller). An example of pod VM 130 is described further below with respect to FIG. 2. Some native VMs 140 have specific functions within host cluster 118, such as control VMs 143 and support VMs 145. Control VMs 143 are VMs that implement control planes as described further herein. Support VMs 145 are VMs that are created by a control plane to support applications implemented using pod VMs 130 and/or native VMs 140. An embodiment of software platform 124 is discussed further below with respect to FIG. 2.

Software platform 124 is configured with software-defined (SD) networking 175. SD networking 175 includes a data plane having various logical components, such as routers, switches, gateways, firewalls, load balancers, and the like, coupled to form logical networks that overlay network 180. The terms "logical" and "virtual" are used interchangeably herein with respect to SD networking 175. SD networking 175 includes a control plane configured to manage the data plane. Some components of the control and data planes are implemented as support VMs 145 (e.g., logical router control VMs, load balancers, edge gateways, etc.). Other components are implemented as part of hypervisor 150 (e.g., logical switches, logical routers, distributed firewalls, etc.).

VM management server 116 is a physical or virtual server that provisions pod VMs 130 and VMs 140 from the hardware resources of hosts 120 VM management server 116 installs a control plane agent 152 in hypervisor 150 to add a host 120 as a management entity. VM management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in the cluster may be one or many. Each host 120 in cluster 118 has access to shared storage 170 via network 180. VM management server 116 can also communicate with shared storage 170 via network 180 to perform control operations thereon.

In an embodiment, VM management server 116 includes a resource scheduler 108. Resource scheduler 108 is configured to aggregate the resources of host cluster 118 to provide resource pools and enforce resource allocation policies. Resource scheduler 108 also provides resource management in the form of load balancing, power management, VM placement, and the like.

In an embodiment, VM management server 116 further includes a supervisor cluster service 109. Supervisor cluster service 109 configures host cluster 118 to be part of a supervisor cluster 101. Supervisor cluster service 109 installs a control plane agent 152 in hypervisor 150 to add a host 120 to supervisor cluster 101. Supervisor cluster 101 integrates an orchestration control plane, such as Kubernetes, with host cluster 118. In embodiments, Kubernetes is described as the orchestration control plane for supervisor cluster 101. In supervisor cluster 101, hosts 120 become nodes for use by the orchestration control plane. Supervisor cluster service 109 provisions one or more virtual servers as "master servers" to manage the orchestration control plane. In the embodiment of FIG. 1, supervisor cluster 101 includes a supervisor Kubernetes master 104 that functions as a master server for an orchestration control plane 115 of supervisor cluster 101. For purposes of clarity, supervisor Kubernetes master 104 is shown as a separate logical entity. For implementations, supervisor Kubernetes master 104 can be implemented as a control VM 143 (an optionally pod VMs 130) in host cluster 118. Further, although only one supervisor Kubernetes master 104 is shown, supervisor cluster 101 can include more than one supervisor Kubernetes master 104. An embodiment of supervisor Kubernetes master 104 is described below with respect to FIG. 3.

In an embodiment, system 100 further includes storage manager 110. Storage manager 110 is a physical or virtual server that provisions virtual disks in shared storage 170 (or a vSAN formed from local storage 163) as independent objects. That is, virtual disks that persist apart from the lifecycle of any VM or container. Various components can interact with storage manager 110 to provision persistent storage, such as VM management server 116 and supervisor Kubernetes master 104. Storage manager 110 can operate independently from VM management server 116 (e.g., as an independent physical or virtual server). Alternatively, storage manager 110 can be a service in VM management server 116 (e.g., alongside components such as resource scheduler 108 and supervisor cluster service 109).

In an embodiment, system 100 further includes a network manager 112. Network manager 112 is a physical or virtual server that manages SD networking 175 for hosts 120. Network manager 112 can install a control plane agent 152 in hypervisor 150 to add a host 120 as a management entity. Network manager 112 configures host cluster 118 to be part of a transport zone 103. Transport zone 103 integrates logical networking control and data planes with host cluster 118. In transport zone 103, hosts 120 become transport nodes having shared logical networking resources. Network manager 112 can operate independently from VM management server 116 (e.g., as an independent physical or virtual server). Alternatively, network manager 112 can be a service of VM management server 116 (e.g., alongside components such as resource scheduler 108 and supervisor cluster service 109).

VM management server 116, network manager 112, and storage manager 110 comprise a virtual infrastructure (VI) control plane 113 for host cluster 118. In embodiments, one or more of VM management server 116, network manager 112, and storage manager 110 are implemented using control VM(s) 143. Alternatively, one or more of VM management server 116, network manager 112, and storage manager 110 can be external to host cluster 118.

In an embodiment, system 100 further includes an image registry 190 and a container repository 192. As described further herein, containers of supervisor cluster 101 execute in pod VMs 130. Containers are spun up from container images. Container images are registered with image registry 190, which manages a plurality of container repositories (one of which is shown in FIG. 1 as container repository 192) in which images of all containers registered with image registry 190 are stored. During registration of a container image, image registry 190 collects authentication information and during subsequent requests to access the registered container images, authenticates the requester using the collected authentication information. Once the requester is authenticated, image registry 190 permits the requester to fetch the container images registered to the requester.

A VI administrator (VI admin) can interact with VM management server 116 through a VM management client 106. Through VM management client 106, a VI admin commands VM management server 116 to form host cluster 118, configure resource pools, resource allocation policies, and other cluster-level functions, configure storage and networking, and create supervisor cluster 101. VM management server 116 maintains a database 111 of objects being managed (e.g., clusters, datastores, folders, hosts, networks, resource pools, VMs, etc.). VM admin can also interact with VM management server 116 to define supervisor namespaces 117. A supervisor namespace 117 provides resource constraints, authorization constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD networking 175). Authorization constraints include definitions of users, roles, privileges, bindings of roles to privileges, and the like. Each supervisor namespace 117 includes a portion within orchestration control plane 115, which allows users to provision applications in supervisor cluster 101 within the scope of supervisor namespaces 117. Supervisor namespaces 117 provide single units of management for the applications, each of which can include multiple workloads implemented using multiple objects, such as VMs, containers, storage, and networking. VI admin can perform an operation on a supervisor namespace 117, the result of which is applied across multiple objects of the application.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace 117. In response, supervisor Kubernetes master 104 configures supervisor cluster 101 to match the desired state by creating pod VMs 130, creating native VMs 140, connecting VMs to storage and logical networks, destroying pod VMs 130 and native VMs 140, and the like. The resources are deployed within the confines of the supervisor namespace. In this manner, a user interacts with supervisor Kubernetes master 104 to deploy applications in supervisor cluster 101 within defined supervisor namespaces 117. One such application, as described further below, is a container orchestration system referred to as a "guest cluster." For example, a guest cluster can be a Kubernetes cluster deployed as a virtual extension of supervisor cluster 101.

Figure 2:
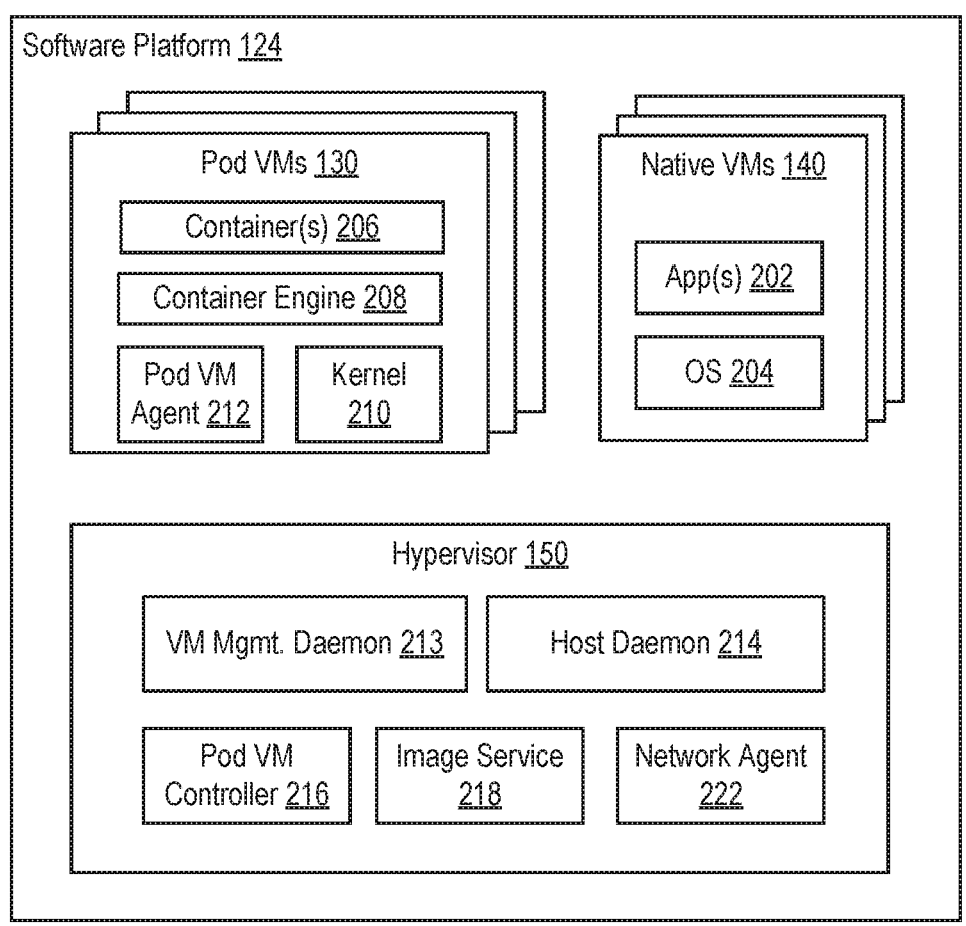
FIG. 2 is a block diagram depicting a software platform according an embodiment.

FIG. 2 is a block diagram depicting software platform 124 according an embodiment. As described above, software platform 124 of host 120 includes hypervisor 150 that supports execution of pod VMs 130 and native VMs 140. In an embodiment, hypervisor 150 includes a VM management daemon 213, a host daemon 214, a pod VM controller 216, an image service 218, and a network agent 222. VM management daemon 213 is a control plane agent 152 of VI control plane 113. VM management daemon 213 provides an interface to host daemon 214 for VM management server 116. Host daemon 214 is configured to create and destroy VMs (e.g., pod VMs 130 and native VMs 140).

Pod VM controller 216 is a control plane agent 152 of orchestration control plane 115 for supervisor cluster 101 and allows Kubernetes master 104 to interact with hypervisor 150. Pod VM controller 216 configures the respective host as a node in orchestration control plane 115. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images.

Network agent 222 comprises a control plane agent 152 of SD networking 175. Network agent 222 is configured to cooperate with network management and control planes (e.g., network manager 112) to implement logical network resources. Network agent 222 configures the respective host as a transport node in a transport zone managed by network manager 112.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd.

Each of containers 206 has a corresponding container image (CI) stored as a read-only virtual disk in shared storage 170. These read-only virtual disks are referred to herein as CI disks. Additionally, each pod VM 130 has a virtual disk provisioned in shared storage 170 for reads and writes. These read-write virtual disks are referred to herein as ephemeral disks. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks of shared storage 170.

Figure 3:
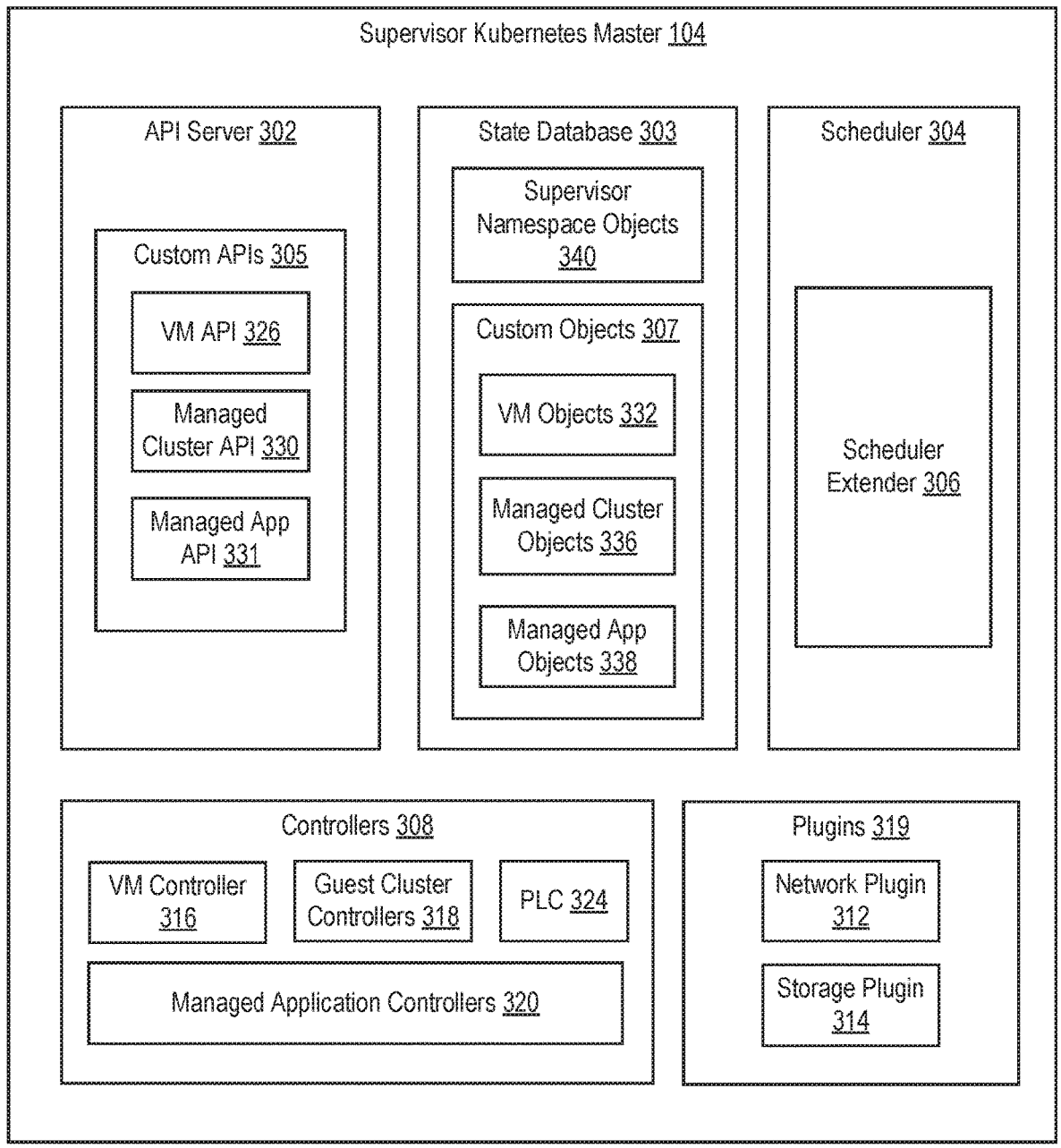
FIG. 3 is a block diagram of Kubernetes master according to an embodiment

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319. Controllers 308 can include, for example, VM controller 316, guest cluster controllers 318, platform lifecycle controller (PLC) 324, and managed application controller(s) 320. Plugins 319 can include, for example, network plugin 312 and storage plugin 314.

API server 302 provides an API for use by Kubernetes client 102 (e.g., kube-apiserver). API server 302 is the front end of orchestration control plane 115. The Kubernetes API provides a declarative schema for creating, updating, deleting, and viewing objects. State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state.

Namespaces provide scope for Kubernetes objects. Namespaces are objects themselves maintained in state database 303. A namespace can include resource quotas, limit ranges, role bindings, and the like that are applied to objects declared within its scope. As described above, a VI admin cooperates with VM management server 116 to define supervisor namespaces 117 for supervisor cluster 101. A supervisor namespace 117 is a resource-constrained and authorization-constrained unit of multi-tenancy managed by VM management server 116. State database 303 stores supervisor namespace objects 340. VM management server 116 creates a supervisor namespace object 340 for each supervisor namespace 117, pushing down resource constraints and authorization constraints into orchestration control plane 115.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods Scheduler 304 cooperates with scheduler extender 306, which interfaces with VM management server 116. Scheduler extender 306 cooperates with VM management server 116 (e.g., such as with resource scheduler 108) to select nodes from candidate sets of nodes and provide identities of hosts 120 corresponding to the selected nodes. For each pod, scheduler 304 also converts the pod specification to a pod VM specification, and scheduler extender 306 asks VM management server 116 to reserve a pod VM on the selected host 120. Scheduler 304 updates pods in state database 303 with host identifiers A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems. PLC 324 is responsible for tracking pods that have assigned nodes without pod VM identifiers. PLC 324 cooperates with VM management server 116 to commit reserved pod VMs for pods. VM management server 116 returns a pod VM identifier to PLC 324, which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 302. Alternatively, an extension API server can be used to introduce a custom object 307 by API server aggregation, where the extension API server is fully responsible for the custom resource. A user interacts with custom APIs 305 of API server 302 to create custom objects 307 tracked in state database 303. A controller 308 is used to watch for and actuate on custom objects 307 declared in state database 303. In Kubernetes, a controller responsible for the lifecycle of custom resources is referred to as an "operator." However, the term controller will be used throughout this specification for consistency.

In an embodiment, orchestration control plane 115 is extended to support orchestration of native VMs, guest clusters, and other managed application(s). This extensibility can be implemented using either CRDs or an extension API server in supervisor Kubernetes master 104. Custom APIs 305 include VM API 326, managed application API 331, and managed cluster API 330. A user or a controller 308 can invoke VM API 326 to create VM objects 332, which represent native VMs.

In embodiments, the controlled extensibility of the supervisor cluster is leveraged to deliver a "guest cluster" as a custom object ("managed cluster objects 336"). The guest cluster comprises a standard Kubernetes control plane and associated nodes, as well as components for interfacing the underlying supervisor cluster. The guest cluster executes within compute objects of managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster). Guest clusters build on the workload management functionality provided by the supervisor cluster, which provides development teams with familiar control over cluster configuration and cluster lifecycle.

A user can invoke managed cluster API 330 to create managed cluster objects 336. A managed cluster object 336 defines a Kubernetes cluster at a high level to be implemented as a guest cluster. For example, a managed cluster object 336 can be specified by a cluster name, version of Kubernetes to use, a storage class to apply to the control plane nodes, a number of worker nodes, and a storage class to apply to the worker nodes. Other specifications for a managed cluster object 336 can be computed, inherited, or have default values. Similar to managed clusters, a user can invoke managed application API 331 to create managed application objects 338. A managed application object 338 defines an application, which can include various components, such as a Kubernetes cluster, a legacy application, microservices, and a database application.

Each of the custom objects 307 has a corresponding controller 308. VM controller 316 is configured to monitor state database 303 for creation of VM objects 332. VM controller 316 cooperates with VM management server 116, network manager 112, and/or storage manager 110 to deploy native VMs 140 to implement VM objects 332. VM controller 316 manages the lifecycle of native VMs 140 implementing VM objects 332. Guest cluster controllers 318 are configured to monitor state database 303 for creation of managed cluster objects 336. Guest cluster controllers 318 consume the specification of a managed cluster object 336 and define various objects that represent an abstract implementation and a physical implementation of a Kubernetes cluster per the specification. Managed application controllers 320 are configured to monitor state database 303 for creation of managed application objects 338. Managed application controllers 320 consume the specification of a managed application object 338 and define various objects that represent abstract and physical implementations of a compound application per the specification. VM controller 316, managed application controllers 320, and guest cluster controllers 318 also manage lifecycles of their respective objects.

Plugins 319 provide a well-defined interface to replace a set of functionality of the Kubernetes control plane. Network plugin 312 is responsible for configuration of logical networking of SD networking 175 to satisfy the needs of network-related resources. Network plugin 312 cooperates with VM management server 116 and/or network manager 112 to implement the appropriate logical network resources Storage plugin 314 is responsible for providing a standardized interface for persistent storage lifecycle and management to satisfy the needs of resources requiring persistent storage. Storage plugin 314 cooperates with VM management server 116 and/or storage manager 110 to implement the appropriate persistent storage volumes in shared storage 170.

Figure 4:
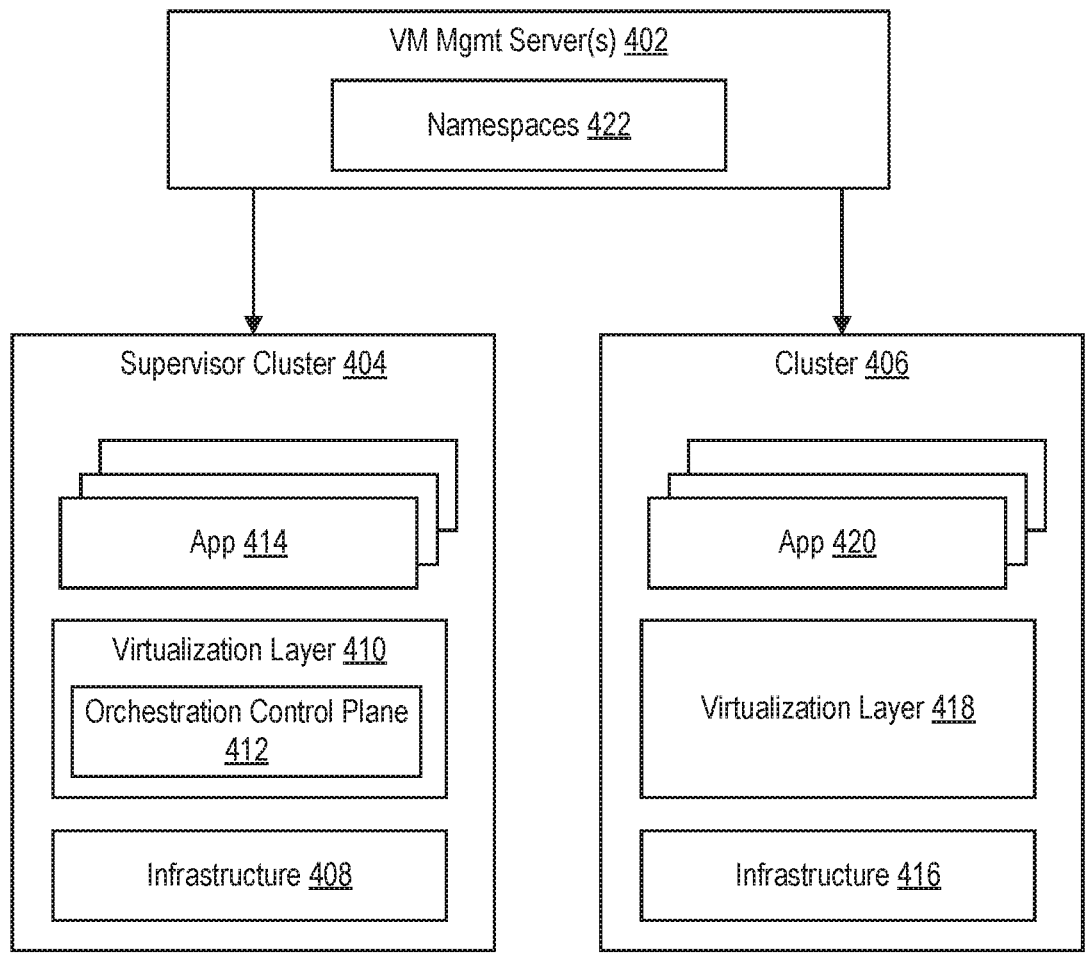
FIG. 4 is a block diagram depicting a logical view of a virtualized computing system according to an embodiment.

FIG. 4 is a block diagram depicting a logical view of a virtualized computing system according to an embodiment. FIG. 4 illustrates that the concept of supervisor namespaces 117 can be extended for use in a generalized host cluster in addition to a supervisor cluster. The term "namespace" is meant to encompass a resource constrained, authorization constrained, policy constrained unit of multi-tenancy for any host cluster. A namespace is deployed in a VI control plane that manages a host cluster. A supervisor namespace is a type of namespace deployed with respect to a supervisor cluster. A supervisor namespace is distributed between the VI control plane and the orchestration control plane of the supervisor cluster. The portion of the supervisor namespace deployed in the orchestration control plane is referred to as a "native namespace," indicating that the namespace is native to the orchestration control plane. For example, a portion of a supervisor namespace can be a Kubernetes namespace in a Kubernetes derived orchestration control plane as described herein. Thus, supervisor namespace objects 340 in state database 303 of supervisor Kubernetes master 104, which are portion of supervisor namespaces 117, are Kubernetes namespaces.

As shown in FIG. 4, one or more VM management servers 402 are coupled to a supervisor cluster 404 and a host cluster 406. Host cluster 406 is not enabled as a supervisor cluster. While one supervisor cluster 404 and one cluster 406 are shown, the system can include one or more supervisor clusters 404, one or more host clusters 406, or both. Supervisor cluster 404 includes a virtualization layer 410 executing on infrastructure 408. Infrastructure 408 comprises hardware platforms of the constituent hosts. Virtualization layer 410 comprises the hypervisors of the constituent hosts. Thus, the term "virtualization layer" as used herein encompasses both a hypervisor executing on a single host or multiple hypervisors executing on a cluster of hosts depending on the context (e.g., one host versus cluster or plurality of hosts). Likewise, cluster 406 includes a virtualization layer 418 executing on infrastructure 416. Supervisor cluster 404 includes an orchestration control plane 412 integrated with virtualization layer 410 (e.g., derived from a Kubernetes control plane). Virtualization layer 418 in cluster 406 does not include an orchestration control plane. Applications 414 are deployed on top of virtualization layer 410, and applications 420 are deployed on top of virtualization layer 418. VM management server 402 defines namespaces 422 into which applications are to be deployed. Thus, each application 414 and each application 420 is deployed in a respective namespace 422.

Figure 5A:
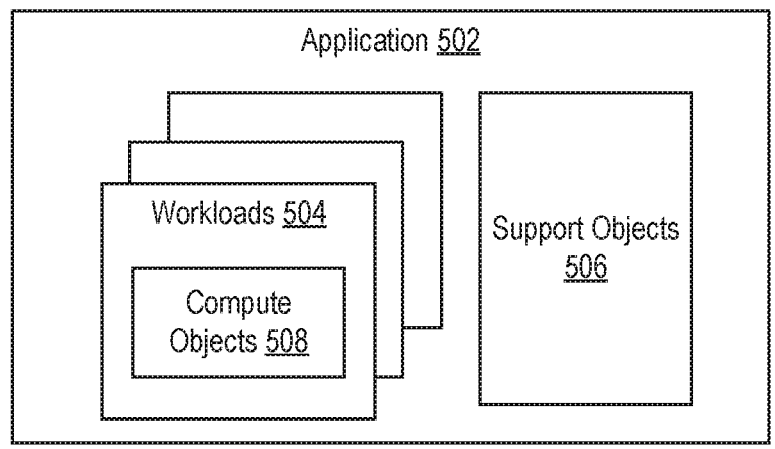
FIG. 5A is a block diagram depicting a logical view of an application according to an embodiment.

FIG. 5A is a block diagram depicting a logical view of an application 502 according to an embodiment. A user defines application 502 having a plurality of workloads 504 and optionally one or more support objects 506. Each workload 504 comprises one or more compute objects 508. Compute objects 508 include VMs, containers, or a combination thereof. Support objects 506 include network and storage objects for each workload 504 and/or shared by workloads 504. A user can interact with supervisor Kubernetes master 104 through Kubernetes client 102 to provide a specification for an application 502. Alternatively, if no orchestration control plane present, a user can interact with VM management server 116 and/or a virtualization layer directly to deploy an application 502. In either case, application 502 is deployed within a namespace defined in the virtualized computing system (e.g., a supervisor namespace 117 for supervisor cluster 101).

Figure 5B:
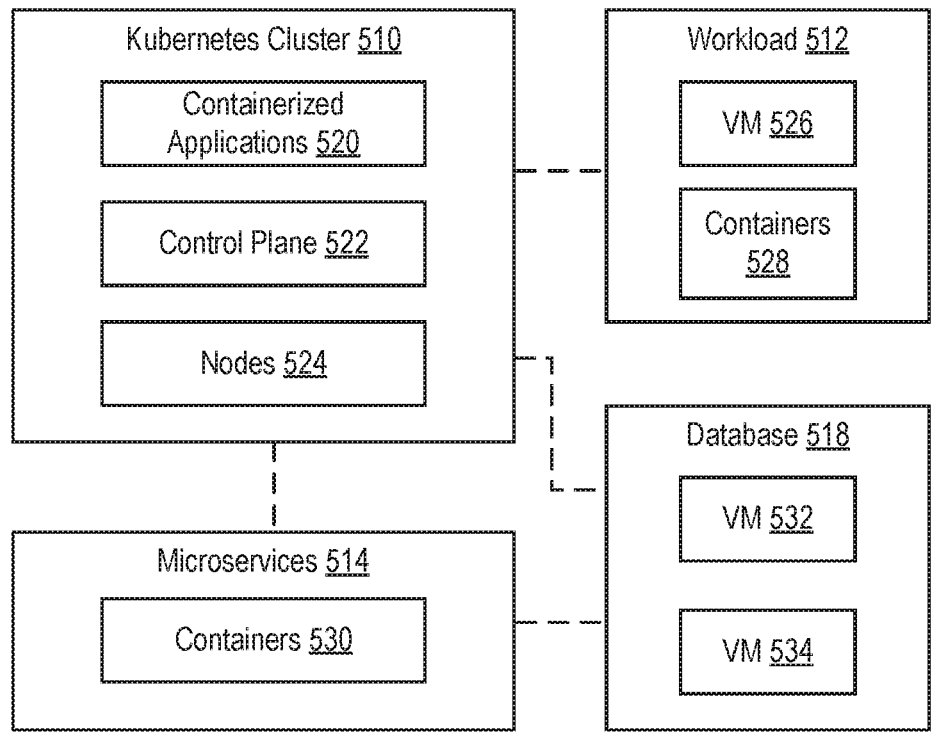
FIG. 5B is a block diagram depicting an example application according to an embodiment.

FIG. 5B is a block diagram depicting an example application 503 according to an embodiment. Application 503 includes workloads comprising a Kubernetes cluster 510, a workload 512, microservices 514, and a database 518. Kubernetes cluster 510 includes nodes 524 and a control plane 522 that support containerized applications 520. Kubernetes cluster 510 is implemented using one or more native VMs 140 (not explicitly shown). Workload 512 is specified by a VM object for a VM 526 and a pod object for containers 528. Microservices 514 are specified by pod objects for containers 530. Database 518 is specified by VM objects for VMs 532 and 534. Application 503 includes network connections among Kubernetes cluster 510, workload 512, database 518, and microservices 514. Application 503 is an example of a modern application having multiple distinct workloads implemented using discrete compute objects and associated network objects. A user can deploy application 503 within a supervisor namespace 117 so that an admin can manage application 503 as a single unit in VM management server 116.

Figure 6:
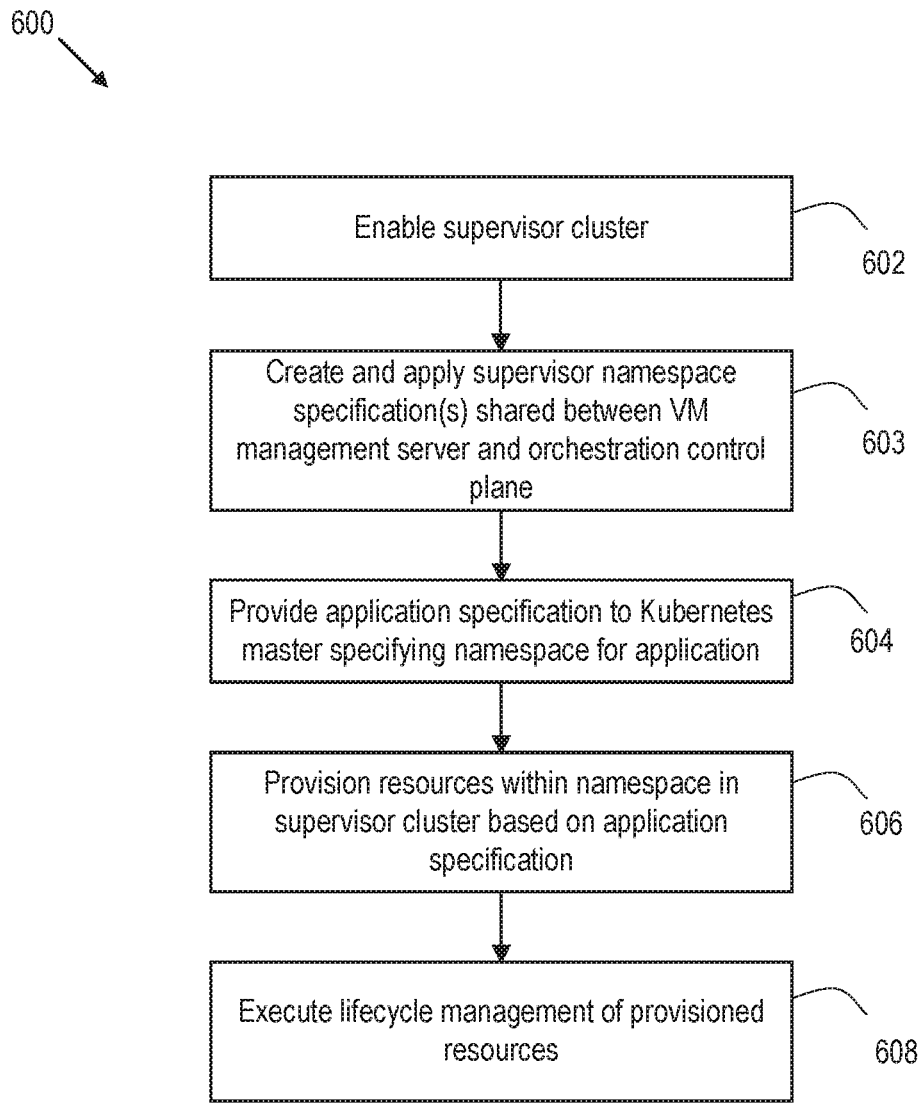
FIG. 6 is a flow diagram depicting a method of creating a supervisor cluster and managing container orchestration therein according to an embodiment.

FIG. 6 is a flow diagram depicting a method 600 of creating a supervisor cluster and managing container orchestration therein according to an embodiment. Method 600 can be performed by VI control plane 113 and orchestration control plane 115, which comprise software executing on CPU, memory, storage, and network resources managed by a virtualization layer (e.g., a hypervisor) and/or host operating system. Method 600 begins at step 602, where a VI admin interacts with VM management server 116 through VM management client 106 to enable supervisor cluster 101. In an embodiment, the VI admin provides a declarative specification to VM management server 116 that results in enabling host cluster 118, deploying supervisor Kubernetes master 104, and provisioning networking within SD networking 175. VM management server 116 then takes the necessary action to enable supervisor cluster 101.

At step 603, VM management server 116 creates and applies supervisor namespace specification(s) to orchestration control plane 115 (e.g., Kubernetes® master 104). A VI admin interacts with VM management server 116 to define one or more supervisor namespaces 117 (e.g., having resource constraints, authorization constraints, policies, etc.). VM management server 116 creates the corresponding objects in VI control plane 113 (e.g., resource pools, user access policy, etc.). VM management server 116 then applies the specification(s) of supervisor namespace(s) 117 to orchestration control plane 115, for example, by cooperating with Kubernetes® master 104 to create a supervisor namespace object 340 for each supervisor namespace 117. Each supervisor namespace object 340 includes resource constraints, authorization constraints, and the like derived from a supervisor namespace 117.

At step 604, a user having access to supervisor cluster 101 provides an application specification to supervisor Kubernetes master 104. The application specification can include the various objects defined within a supervisor namespace 117, such as pods, VM objects, storage objects, managed application objects, and the like. At step 606, supervisor Kubernetes master 104, in cooperation with VM management server 116 and hypervisor 150 in hosts 120, provisions resources within a supervisor namespace 117 in supervisor cluster 101 based on the application specification. For example, supervisor Kubernetes master 104 controls creation of pod VMs 130 for any specified pod objects Supervisor Kubernetes master 104 controls creation of native VMs 140 for any specified VM objects. Supervisor Kubernetes master 104 cooperates with network manager 112 to configure SD networking 175 for any specified service objects. Supervisor Kubernetes master 104 controls creation of persistent volumes for any specified persistent storage objects. Supervisor Kubernetes master 104 controls creation of managed applications for any specified manage application objects. At step 608, pod VM controller 216, pod VM agent 212, supervisor Kubernetes master 104, and VM management server 116 cooperate to execute lifecycle management of the provisioned resources (e.g., lifecycle management of pod VMs 130, native VMs 140, managed applications, etc.)

Figure 7:
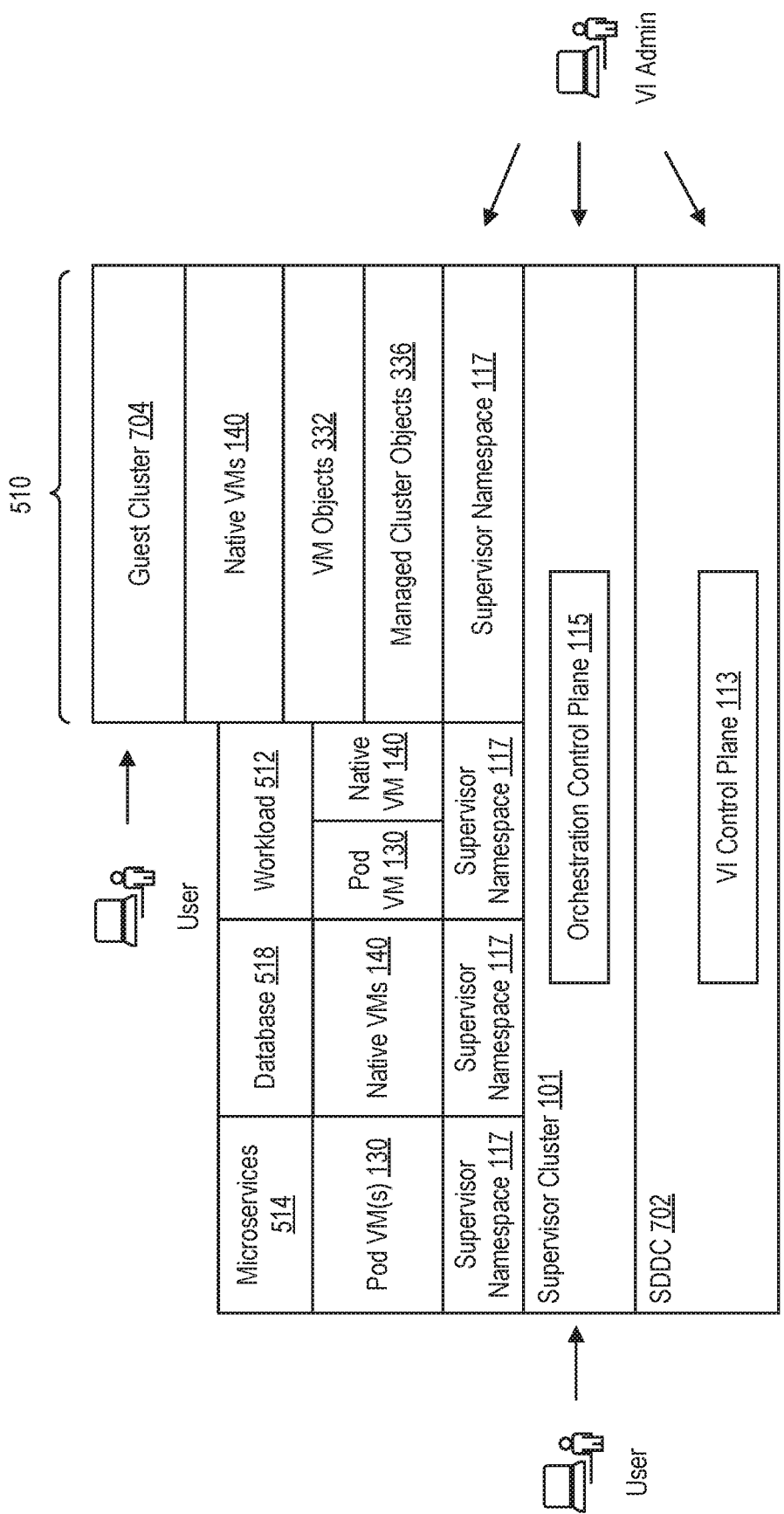
FIG. 7 is a block diagram depicting application deployments on a supervisor cluster according to an embodiment.

FIG. 7 is a block diagram depicting implementation of application specification 503 on supervisor cluster 101 according to an embodiment Supervisor cluster 101 is implemented by a software-defined data center (SDDC) 702. SDDC 702 includes virtualized computing system 100 shown in FIG. 1, including host cluster 118, VM management server 116, network manager 112, storage manager 110, shared storage 170, and SD networking 175. SDDC 702 includes VI control plane 113 for managing a virtualization layer of host cluster 118, along with shared storage 170 and SD networking 175. A VI admin interacts with VM management server 116 (and optionally network manager 112) of VI control plane 113 to configure SDDC 702 to implement supervisor cluster 101.

Supervisor cluster 101 includes orchestration control plane 115, which includes supervisor Kubernetes master(s) 104 and pod VM controllers 216. The VI admin interacts with VM management server 116 to create supervisor namespaces 117. Each supervisor namespace 117 includes a resource pool and authorization constraints. The resource pool includes various resource constraints on supervisor namespace 117 (e.g., reservation, limits, and share (RLS) constraints). Authorization constraints provide for which roles are permitted to perform which operations in supervisor namespace 117 (e.g., allowing VI admin to create, manage access, allocate resources, view, and create objects; allowing DevOps to view and create objects; etc.). A user interacts with supervisor Kubernetes master 104 to deploy applications on supervisor cluster 101 within scopes of supervisor namespaces 117. In the example, the user deploys microservices 514 on pod VM(s) 130, database 518 on native VM 140, and workload 512 on both a pod VM 130 and a native VM 140.

The user also deploys guest cluster 704 on supervisor cluster 101 within a supervisor namespace 117 to implement Kubernetes cluster 510. Guest cluster 704 is constrained by the authorization and resource policy applied by the supervisor namespace in which it is deployed. Orchestration control plane 115 includes guest cluster infrastructure software (GCIS) configured to realize guest cluster 526 as a virtual extension of supervisor cluster 101. The GCIS creates and manages managed cluster objects 336 to provide an abstract representation of infrastructure supporting guest cluster 526 (nodes 524) and VM objects 332 to provide a physical representation of the infrastructure (native VMs 140 implementing nodes 524). GCIS comprises guest VM API 326, VM controller 316, managed cluster API 330, and guest cluster controllers 318. A user can interact with the Kubernetes control plane (control plane 522) in guest cluster 704 to deploy various containerized applications 520.

Figure 8A:
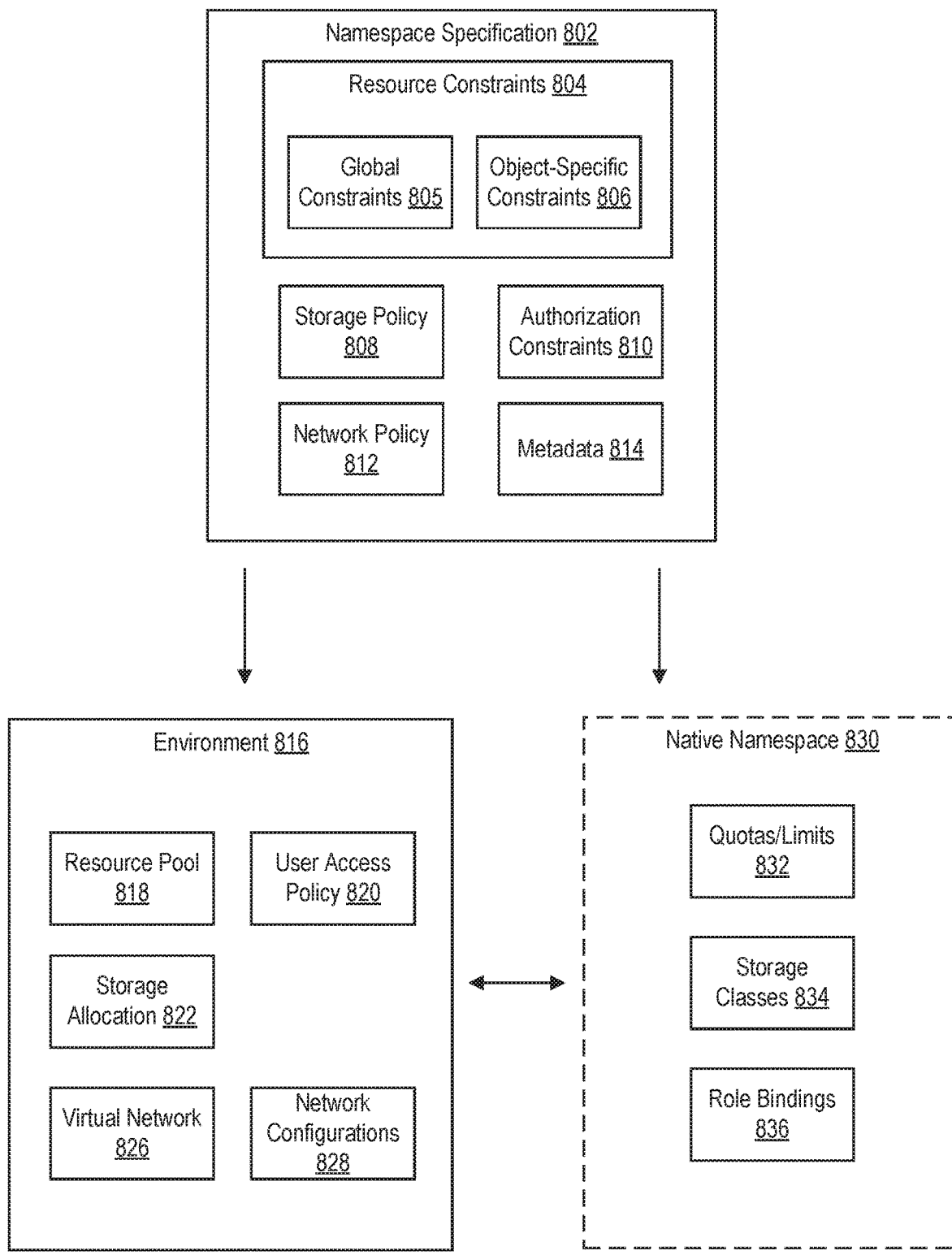
FIG. 8A is a block diagram depicting a logical view of a namespace specification and its configuration of a virtualized computing system according to an embodiment.
Figure 8B:
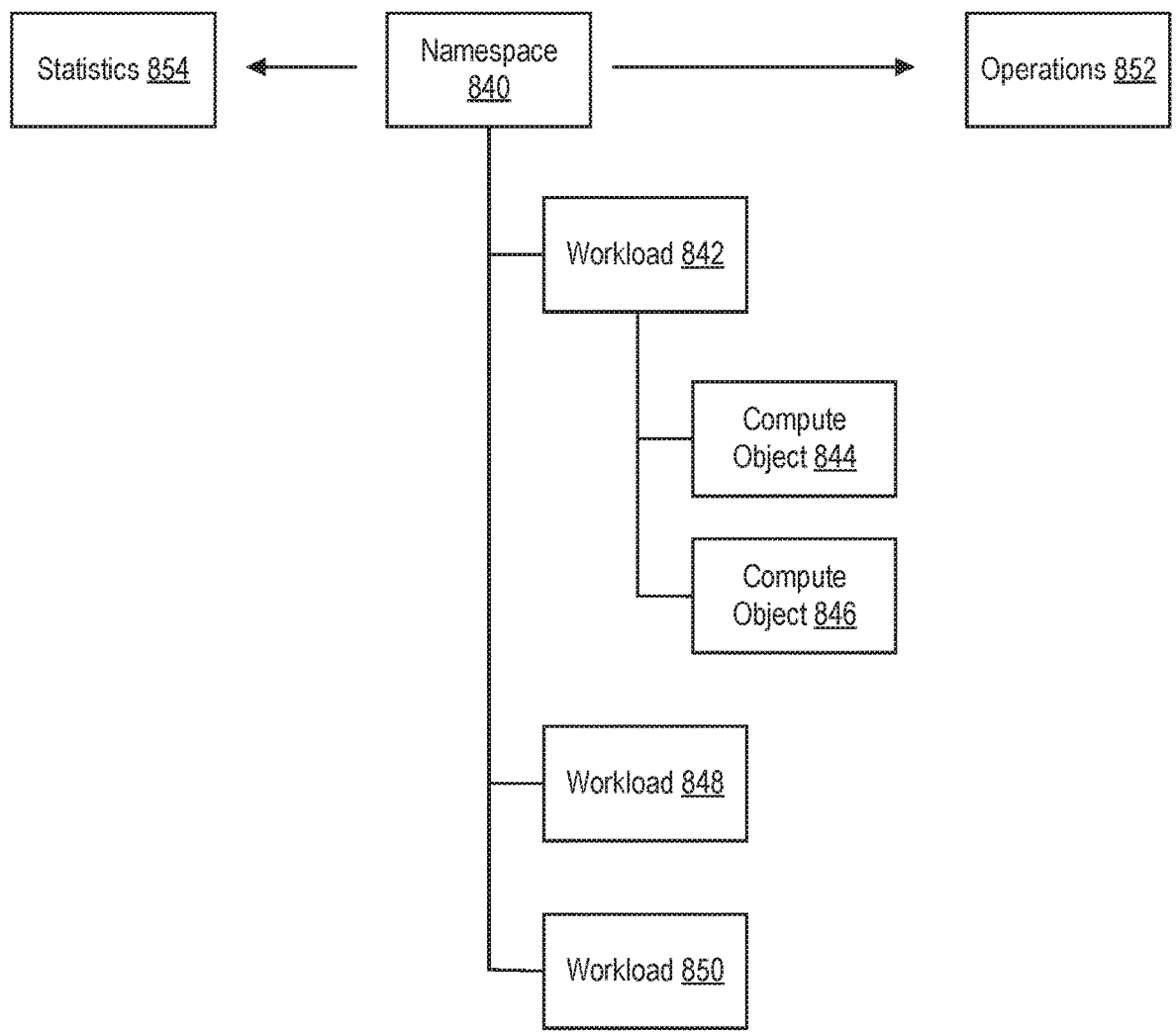
FIG. 8B is a block diagram depicting an example namespace and its management in a VM management server according to an embodiment.
Figure 9:
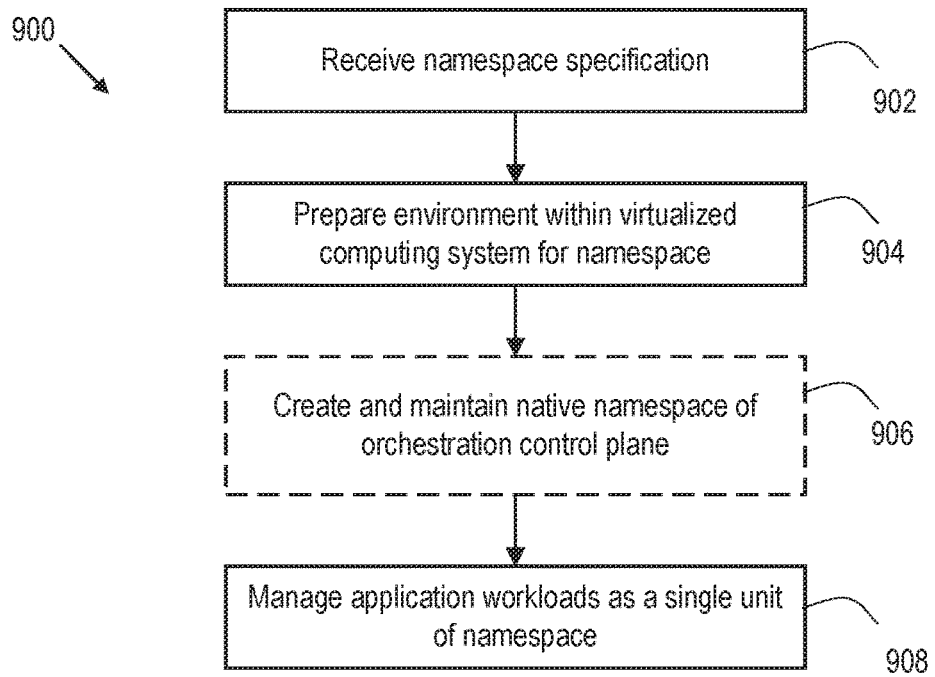
FIG. 9 is a flow diagram depicting a method of managing an application in a virtualized computing system according to an embodiment.

FIG. 8A is a block diagram depicting a logical view of a namespace specification and its configuration of a virtualized computing system according to an embodiment. FIG. 8B is a block diagram depicting an example namespace and its management in a VM management server according to an embodiment. FIG. 9 is a flow diagram depicting a method 900 of managing an application in a virtualized computing system according to an embodiment. Aspects of method 900 may be understood with reference to the logical diagrams shown in FIGS. 8A-8B. Method 900 may be executed by VM management server 116, which comprises software executing on CPU, memory, storage, and network resources managed by a host operating system (OS) or a virtualization layer (e.g., a hypervisor). For example, VM management server 116 can be a VM 140 in a host 120.

Method 900 begins at step 902, where VM management server 116 receives a namespace specification. A VI admin can interact with VM management server 116 to define the namespace specification. As shown in FIG. 8A, a namespace specification 802 can includes resource constraints 804, a storage policy 808, authorization constraints 810, a network policy 812, and metadata 814. Some data can be omitted from namespace specification 802, where defaults can be provided for the missing data (e.g., storage policy and network policy).

Resource constraints 804 include global constraints 805 and object-specific constraints 806. Global constraints 805 include resource reservations (also referred to as resource quotas) and resource limits that apply to the namespace as a whole. Object-specific constraints 806 include resource reservations and resource limits that apply to specific objects, such as VMs and containers. Resource reservations define a required amount of resources to be consumed (e.g., a minimum amount of resources). Resource limits define a maximum amount of resources to be consumed. Resources include compute (e.g., CPU and memory), storage, and networking resources. In some cases, a VI admin can omit object-specific constraints 806, which can then be provided as default object-specific constraints.

Authorization constraints 810 comprise users, roles, privileges, and role bindings that bind privileges to roles. Roles can include, for example, a VI admin, a cluster admin, and an application developer. A VI admin manages infrastructure in the virtualized computing system. The VI admin is responsible for managing the virtualized infrastructure through the VI control plane. A cluster admin is a member of a development team with expertise in infrastructure and application platforms and operations and can be responsible for managing the orchestration control plane of a supervisor cluster. An application developer is a member of the development team focused on application development and is responsible for deploying applications on supervisor cluster or on guest clusters executing on supervisor cluster. These roles are merely examples and a VI admin can define any number of roles that have different responsibilities. Privileges include operations that can be performed, such as manage infrastructure, update infrastructure, create namespaces, manage access to namespaces, allocate resources to namespaces, view namespaces, deploy objects in namespaces, and the like. Role bindings bind those privileges to specific roles (e.g., a VI admin can perform all operations; a cluster admin can perform namespace operations, but not infrastructure management; an application developer can view and deploy objects in namespaces, but not infrastructure or namespace management).

Metadata 814 includes various information associated with the namespace, such as the name of the namespace, a description of the namespace, a cluster identifier for the namespace, and the like. Further information can be added as desired by the admin creating the namespace. For example, the VI admin can define storage policy 808, which describes difference classes of storage for the namespace (e.g., solid state, NVMe, hard disk, etc.) and features of the storage (e.g., replication, encryption, etc.). The VI admin can define network policy 812, which describes various policies, such as load balancing, security, traffic shaping, port blocking, etc.

Returning to FIG. 9, method 900 proceeds to step 904, where VM management server 116 prepares an environment within virtualized computing system for the namespace. As shown in FIG. 8A, an environment 816 includes a resource pool 818, user access policy 820, storage allocation 822, a virtual network 826, and network configurations 828. VM management server 116 configures the virtualization layer, shared storage, and SD networking based on the namespace specification 802 to provide environment 816.

Resource pool 818 implements global constraints 805. In an embodiment, resource pool 818 includes reservation, limits, and share data (RLS data) for compute (CPU and memory), storage, or networking, or any combination thereof. Reservation and limits are described above. Share data describe the amount of resources consumable by the namespace relative to other namespaces.

User access policy 820 implements authorization constraints 810 within the virtualized computing system. User access policy 820 can be distributed among components, such VI control plane 113, orchestration control plane 115, and the host cluster virtualization layer. User access policy 820 enables users assigned particular roles to perform particular operations on the VI control plane 113, orchestration control plane 115, and the host cluster virtualization layer as defined in authorization constraints 810.

Storage allocation 822 is an allocation of storage resource or a claim for storage resources (rather than an explicit allocation) within the shared storage accessible by the host cluster that complies with storage policy 808 and any storage constraints in resource constraints 804. Storage allocation 822 can be persistent volumes and/or persistent volume claims to be used for on-demand provisioning of such persistent volumes. Virtual network 822 is provisioned in the SD networking of the virtualized computing system and dedicated to the namespace. Compute objects deployed to the namespace include network interfaces to the virtual network 822. Network configurations 828 comprise implementations of network policy 812, such as distributed firewall rules, network address translation rules, and the like.

Returning to FIG. 9, method 900 proceeds to step 906, where VM management server 116 creates and maintains a native namespace of the orchestration control plane (e.g., a Kubernetes control plane) as a part of the namespace. Step 906 is optional and executed in case the host cluster has an integrated orchestration control plane, such as supervisor cluster 101. A method of creating a native namespace is described with respect to FIG. 10 below At step 908, VM management server 116 manages application workloads as a single unit of the namespace. Referring to FIG. 8B, a namespace 840 can include workloads 842, 848, and 850. Each workload 842, 848, and 850 is implemented by one or more compute objects (e.g., VMs and/or containers in pod VMs). In the example, workload 842 is shown as having compute objects 844 and 846. The compute objects for workloads 848 and 850 are not explicitly shown. An admin can perform operations 852 on namespace 840 as a single unit, the results of which are applied across workloads 842, 848, and 850 and their constituent compute objects. Example operations 852 include adjusting the allocation of CPU and memory resources in resource pool 818; replicating a storage resource allocated to namespace 840; generating a snapshot of namespace 840; moving namespace 840 within the host cluster or to another host cluster in the virtualized computing system; or encrypting data of workloads 842, 848, and 850 of namespace 840. An admin can also view statistics 854 associated with namespace 840 as a single unit (e.g., an aggregation of statistics from each of the workloads).

Figure 10:
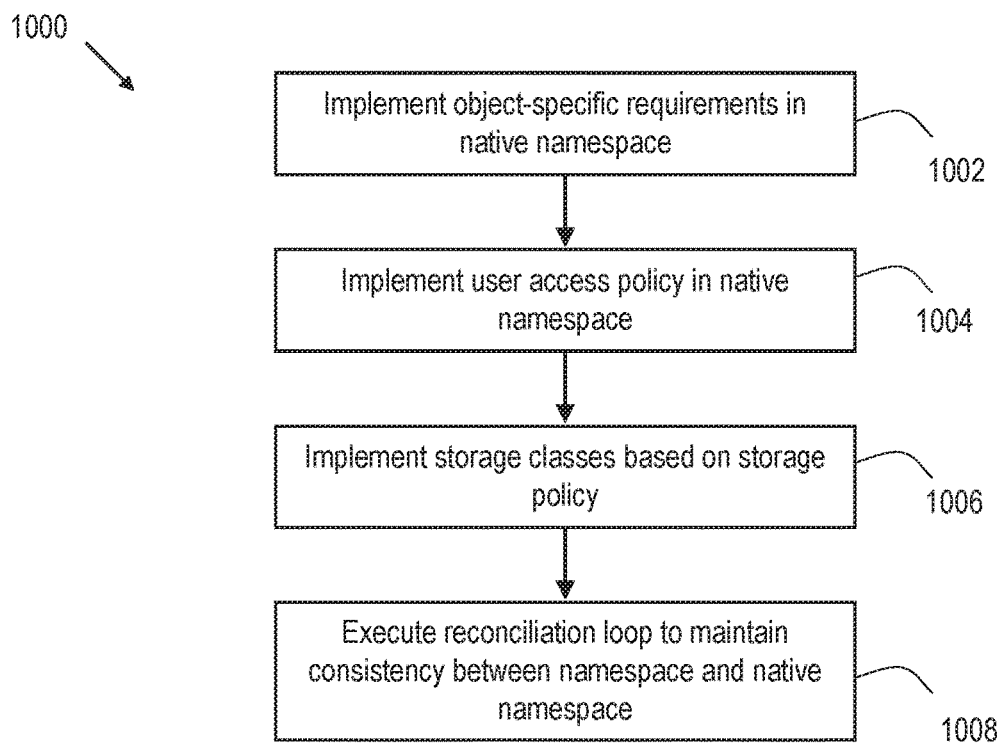
FIG. 10 is a flow diagram depicting a method of creating a native namespace in a container orchestration control plane based on a namespace according to an embodiment.

FIG. 10 is a flow diagram depicting a method 1000 of creating a native namespace in an orchestration control plane based on a namespace according to an embodiment. Aspects of method 1000 may be understood with reference to the logical diagrams shown in FIGS. 8A-8B. Method 1000 may be executed by VM management server 116, which comprises software executing on CPU, memory, storage, and network resources managed by a host operating system (OS) or a virtualization layer (e.g., a hypervisor).

As noted above, VM management server 116 can create a native namespace in a orchestration control plane as a part of a supervisor namespace. In an embodiment, VM management server 116 cooperates with supervisor Kubernetes master 104 to create the native namespace. Method 1000 begins at step 1002, where VM management server 116 implements object-specific constraints in the native namespace based on object-specific constraints 806. For example, a native namespace 830 can include quotas/limits 832 to be implemented at the container level.

At step 1004, VM management server 116 implements user access policy in the native namespace. The user access policy is derived from authorization constraints 810 and a part of user access policy 820. For example, native namespace 830 can include role bindings 836 that specify which roles can perform which operations in orchestration control plane.

At step 1006, VM management server 116 implements storage classes based on the storage policy. As shown in FIG. 8A, namespace specification 802 can include storage policy 808. VM management server 116 can derive storage classes (e.g., high performance, medium performance, standard performance, etc.) from storage policy 808, which are defined as storage classes 834 in native namespace 830.

At step 1008, VM management server 116 executes a reconciliation loop to maintain consistency between the namespace and the native namespace. For example, native namespace may require adjustment after initial creation. In another example, an admin may adjust namespace, which requires a further adjustment in the native namespace.

Techniques for using namespaces as units of management in a clustered and virtualized computing system have been described. Kubernetes provides native namespaces, but such native namespaces provide only limited application management capabilities (e.g., limits on resources, but only as an admission control not a guarantee for resources). Kubernetes native namespaces do not provide for operations, such as data protection, encryption, or mobility. Other systems can use tags, labels, or folders to perform group operations. However, such systems are fragile as objects can be mistagged or not tagged at all. The namespace described herein is a shared abstraction between users and admins that ensures all objects are grouped at creation time with the user providing the context of to which application those objects belong. Other systems attempt to auto-discover the topology of an application by analyzing network traffic or other heuristics. These approaches, however, are imperfect and are typically unable to correctly classify every application component into the correct application, requiring manual intervention and maintenance.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing an application in a virtualized computing system that includes a cluster of hosts managed by a virtualization management server, the hosts including a virtualization layer executing on hardware platforms and an orchestration control plane integrated with the virtualization layer, the method comprising:
receiving a specification for a namespace at the virtualization management server, the specification defining resource constraints and authorization constraints for the namespace;
preparing an environment within the virtualized computing system for the namespace in response to the specification, the environment including:
a resource pool implementing at least a portion of the resource constraints as reservations and limits of resources in the virtualized computing system; and
a user access policy implementing the authorization constraints within the virtualized computing system for the namespace; and
executing, as a single unit by the virtualization management server through an application programming interface (API) of a master server of the orchestration control plane, workloads of the application on the virtualization layer within the resource pool consistent with the user access policy.

2. The method of claim 1, wherein the step of managing comprises performing an operation on the namespace as the single unit, the result of the operation being collectively applied to the workloads.

3. The method of claim 2, wherein the operation comprises: adjusting the allocation of CPU and memory resources in the resource pool for the namespace; replicating a storage resource allocated to the namespace; generating a snapshot of the namespace; moving the namespace within the cluster of hosts or to another cluster of hosts in the virtualized computing system; or encrypting data of the workloads in the namespace.

4. The method of claim 1, wherein the environment further includes a virtual network defined in the virtualization layer for the namespace, and wherein the workloads are deployed on the virtualization layer with network interfaces to the virtual network.

5. The method of claim 4, wherein the environment further includes a network policy for the namespace applied to the network interfaces of the workloads.

6. The method of claim 1, wherein the specification includes a storage policy, and wherein the environment comprises an allocation of storage resource, within storage shared by the hosts, complying with the storage policy.

7. The method of claim 1, further comprising:
creating, by the virtualization management server using the API of the master server, a native namespace of the orchestration control plane associated with the namespace.

8. The method of claim 7, wherein the workloads include compute objects, the compute objects including containers, wherein the resource constraints include object-specific constraints and wherein the step of creating the native namespace comprises:
implementing, by the virtualization management server, the object-specific constraints in the native namespace.

9. The method of claim 7, wherein the step of creating the native namespace comprises:
implementing, by the virtualization management server, the user access policy in the native namespace.

10. The method of claim 7, wherein the workloads of the application include compute objects comprising containers and virtual machines (VMs), the containers supported by container engines in pod VMs, the orchestration control plane including pod VM controllers executing in the virtualization layer in cooperation with the master server, and pod VM agents executing in the pod VMs cooperating with the pod VM controllers.

11. A non-transitory computer readable medium comprising instructions to be executed in a computing device to cause the computing device to carry out a method of managing an application in a virtualized computing system that includes a cluster of hosts managed by a virtualization management server, the hosts including a virtualization layer executing on hardware platforms and an orchestration control plane integrated with the virtualization layer, the method comprising:
receiving a specification for a namespace at the virtualization management server, the specification defining resource constraints and authorization constraints for the namespace;
preparing an environment within the virtualized computing system for the namespace in response to the specification, the environment including:
a resource pool implementing at least a portion of the resource constraints as reservations and limits of resources in the virtualized computing system; and
a user access policy implementing the authorization constraints within the virtualized computing system for the namespace; and
executing, as a single unit by the virtualization management server through an application programming interface (API) of a master server of the orchestration control plane, workloads of the application on the virtualization layer within the resource pool consistent with the user access policy.

12. The non-transitory computer readable medium of claim 11, wherein the step of managing comprises performing an operation on the namespace as the single unit, the result of the operation being collectively applied to the workloads.

13. The non-transitory computer readable medium of claim 11, wherein the environment further includes a virtual network defined in the virtualization layer for the namespace, and wherein the workloads are deployed on the virtualization layer with network interfaces to the virtual network.

14. The non-transitory computer readable medium of claim 11, wherein the specification includes a storage policy, and wherein the environment comprises an allocation of storage resource, within storage shared by the hosts, complying with the storage policy.

15. The non-transitory computer readable medium of claim 11, wherein the method further comprises:
creating, by the virtualization management server using the API of the master server, a native namespace of the orchestration control plane associated with the namespace.

16. A virtualized computing system, comprising:
a virtualization management server; and
a cluster of hosts managed by the virtualization management server, the hosts including a virtualization layer executing on hardware platforms and an orchestration control plane integrated with the virtualization layer, the virtualization management server configured to:
- receive a specification for a namespace, the specification defining resource constraints and authorization constraints for the namespace;
- prepare an environment within the virtualized computing system for the namespace in response to the specification, the environment including:
  - a resource pool implementing at least a portion of the resource constraints as reservations and limits of resources in the virtualized computing system; and
  - a user access policy implementing the authorization constraints within the virtualized computing system for the namespace; and
- execute, as a single unit by the virtualization management server through an application programming interface (API) of a master server of the orchestration control plane, workloads of the application on the virtualization layer within the resource pool consistent with the user access policy.

17. The virtualized computing system of claim 16, wherein the virtualization management server is configured to manage the workloads by performing an operation on the namespace as the single unit, the result of the operation being collectively applied to the workloads.

18. The virtualized computing system of claim 16, wherein the environment further includes a virtual network defined in the virtualization layer for the namespace, wherein the workloads are deployed on the virtualization layer with network interfaces to the virtual network.

19. The virtualized computing system of claim 16, wherein the virtualization management server is configured to:
- create, using the API of the master server, a native namespace of the orchestration control plane associated with the namespace.

20. The virtualized computing system of claim 19, wherein the workloads of the application include compute objects comprising containers and virtual machines (VMs), the containers supported by container engines in pod VMs, the container orchestration control plane including pod VM controllers executing in the virtualization layer in cooperation with the master server, and pod VM agents executing in the pod VMs cooperating with the pod VM controllers.

* * * * *